United States Patent [19]

Lenz et al.

[11] Patent Number: 4,822,327
[45] Date of Patent: Apr. 18, 1989

[54] JACKET FOR A FLEXIBLE MAGNETIC DISK AND PRODUCTION OF THE JACKET

[75] Inventors: Bernhard Lenz, Rheinmuenster; Kurt Zwintzscher, Willstaedt; Dietrich Gruehn, Appenweier; Hubert Fehrenbach, Kehl; Norbert Holl, Battenberg, all of Fed. Rep. of Germany

[73] Assignee: BASF Aktiengesellschaft, Ludwigshafen, Fed. Rep. of Germany

[21] Appl. No.: 170,032

[22] Filed: Mar. 22, 1988

Related U.S. Application Data

[63] Continuation of Ser. No. 870,906, Jun. 5, 1986, abandoned.

[30] Foreign Application Priority Data

Jun. 5, 1985 [DE] Fed. Rep. of Germany ....... 3520114

[51] Int. Cl.[4] .............................................. B31B 1/64
[52] U.S. Cl. .................................... 493/190; 156/216; 156/227; 264/235; 493/251; 493/946
[58] Field of Search ............... 493/190, 191, 251, 341, 493/946; 264/230, 235, 346; 156/227, 216; 53/206, 266 A, 569

[56] References Cited

U.S. PATENT DOCUMENTS

| | | | |
|---|---|---|---|
| 3,200,182 | 8/1965 | Hechelhammer et al. | 264/235 |
| 4,443,398 | 4/1984 | Martinelli et al. | 264/235 |
| 4,608,039 | 8/1986 | Ferri, Jr. et al. | 493/946 |
| 4,627,829 | 12/1986 | Brady, Jr. et al. | 493/251 |
| 4,630,427 | 12/1986 | Harper et al. | 53/460 |

Primary Examiner—Frederick R. Schmidt
Assistant Examiner—Robert Showalter
Attorney, Agent, or Firm—Keil & Weinkauf

[57] ABSTRACT

The blanks punched out from a film web and folded to form the jacket are then heated for a short time and cooled again in order to eliminate stresses in the jacket material which give rise to deformations and are also produced by the action of heat during processing of the material.

4 Claims, 1 Drawing Sheet

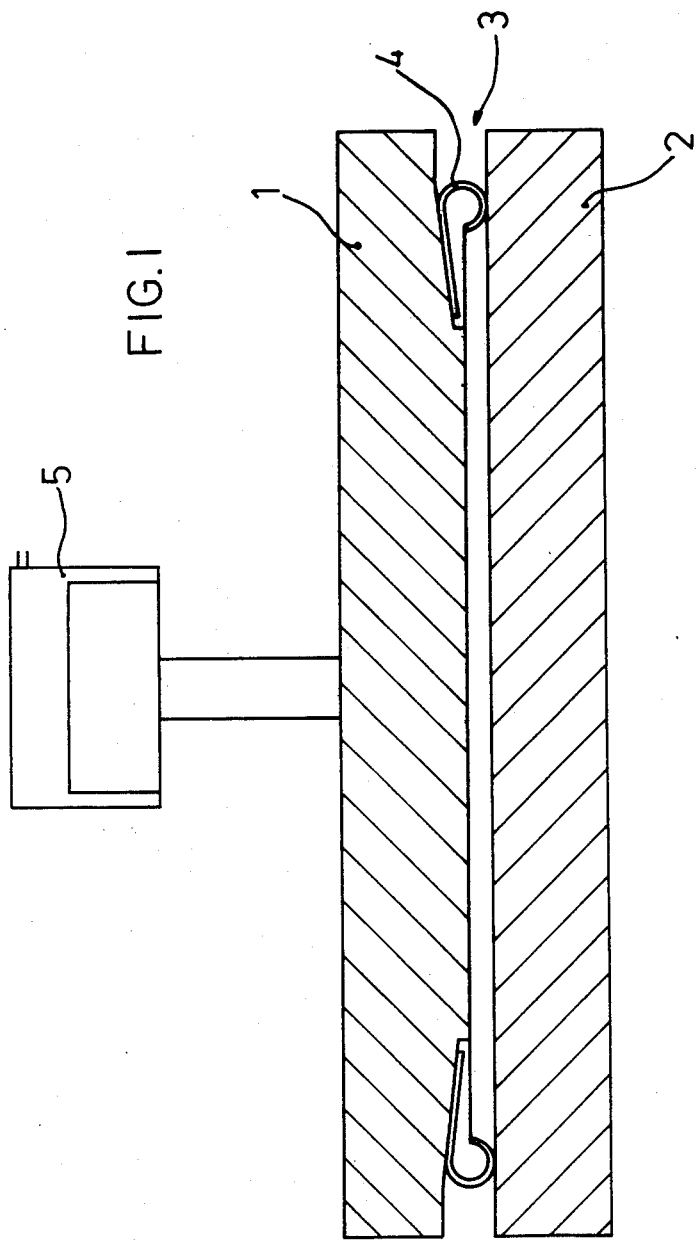

JACKET FOR A FLEXIBLE MAGNETIC DISK AND PRODUCTION OF THE JACKET

This application is a continuation of application Ser. No. 870,906, filed on June 5, 1986, now abandoned.

The present invention relates to a jacket for a flexible magnetic disk, consisting of a blank which is made of film material and is folded and closed around the edge, and whose surfaces which form the inside of the jacket are covered with a nonwoven fabric. The present invention furthermore relates to a process for the production of jackets for flexible magnetic disks, in which blanks are punched out from a web of film material, those surfaces of the blanks which are intended to be the inner surfaces of the jacket are covered with a nonwoven fabric, in which the blanks together with the nonwoven fabric are then folded to form the jacket, and the parts of the blank which are overlapped are joined to one another by means of tabs, by welding or adhesive bonding.

Satisfactory functioning of the flexible magnetic disk, known as a floppy disk to those skilled in the art, is ensured when, inter alia, the jacket which holds the said disk is completely flat and free of any deformation. During the production process described above, however, the film material is repeatedly subjected to heating and cooling operations, which usually lead to stresses in the material. During subsequent disk operation, these stresses may distort the jacket when the latter warms up, which may lead to an impermissible increase in the torque of the disk.

It is an object of the present invention to provide a substantially stress-free jacket for flexible magnetic disks, and a process for its production.

We have found that this object is achieved, according to the present invention, if the jacmet consists of stress-free film material. In the jacket production described at the outset, the individual blanks, after being folded to form the jacket, are heated and then cooled again.

The temperature to which they are heated is advantageously from 5° to 25° C., preferably from 15° to 20° C., below the Vicat softening temperature of the film material used.

The invention is described below with reference to FIG. 1 which shows an embodiment of the apparatus used in carrying out the process according to the invention.

The blanks for the jackets of flexible magnetic disks are punched out from a film web, their functional openings too being punched out in this step. The blanks are covered, on the surface intended to be the inner surface of the jacket, with a nonwoven fabric which serves for cleaning the disk which rotates in the jacket during the read/write operation. Thereafter, each blank is mechanically folded, and processed to a closed jacket by sealing, i.e. by welding or adhesively bonding the overlapped halves of the blank with overlapping tabs. The magnetic disk is inserted into the jacket beforehand, with the end tab open.

The jacket is substantially free of stresses if it is heated directly over the entire surface of the formed jacket with substantially uniform amounts of heat for a short time and cooled again immediately thereafter. Heating eliminates the stresses in the jacket material, and cooling fixes the material in the relaxed state. The treatment can be carried out on the ready-prepared jacket, that is, after the parts of the blank have been sealed together by means of the tabs, or directly after the blank has been folded. For the heating porcedure, it has proven advantageous to select a temperature which is about 5°–25° C., preferably 15°–20° C., below the Vicat softening point of the particular material. It is sufficient to cool the material to about room temperature.

Referring now to the drawing, for heating and cooling the jacket, it is advantageous to provide heatable or coolable plates 1 and 2, respectively, between which the jacket to be treated is arranged. The plates are recessed at the edge in order to be able to accommodate the jacket edge 3, which is thicker because of the tabs 4. While one of the plates is stationary, the other can be driven toward it by means of a pneumatic or hydraulic working cylinder 5. It is sufficient if the latter plate is driven forward to such an extent that the contact produced between the jacket and the plates permits good heat transfer. The duration of heating is from 0.5 to 4 sec, depending on the desired temperature, while the cooling time is from 1 to 5 sec. The plates are heated by means of electrical resistance heaters, while cooling is effected with the aid of a cooling medium, eg. water, flowing through a cavity in the plates. Instead of the resistance heater, it is also possible to use a heating medium which flows through the plates.

Instead of the plates, it is of course also possible to employ other suitable heat sources or coolants, for example radiation sources or a gas jet.

The apparatuses for the above treatment of the jackets can be combined with the folding apparatus for the blanks, so that no further step need be provided for this purpose.

We claim:

1. A process for the production of a jacket for the protection of a flexible magnetic disk, including the steps of
    punching blanks out from a web of film material,
    covering the surfaces of the blanks which are intended to be the inner surfaces of the jacket with a nonwoven fabric,
    then folding the blanks together with the nonwoven fabric to form the jacket, and
    causing the parts of the blank which are overlapped to be sealed together by means of folded-over tabs,
    wherein, subsequent to the folding of the individual blanks, including the tabs, said process also includes the step of heating, by the application of substantially uniform amounts of heat directly over the entire surface area of the formed jacket, and then cooling, the formed jacket as a whole so that stresses set up in the jacket material during the earlier production steps are substantially eliminated.

2. A process as claimed in claim 1, wherein, in the step last mentioned in claim 6, heating is effected at a temperature of from 5° to 25° C., preferably from 15° to 20° C., below the Vicat softening temperature of the film material used.

3. A process as claimed in claim 1, wherein in the step last mentioned in claim 6, the blanks are heated between two contact plates and then cooled again.

4. A process as claimed in claim 1, wherein the step last mentioned in claim 6 is carried out after said parts of the individual blanks have been sealed together by means of said tabs.

* * * * *